United States Patent
Dirks et al.

(10) Patent No.: US 12,422,411 B2
(45) Date of Patent: Sep. 23, 2025

(54) SYSTEM AND METHOD FOR MONITORING AND DIAGNOSIS OF HEAT EXCHANGER TUBE HEALTH

(71) Applicant: Innovas Technologies LLC, Coralville, IA (US)

(72) Inventors: Charles B. Dirks, North Liberty, IA (US); Brian G. Jamieson, Severna Park, MD (US); Michael A. Crocker, Iowa City, IA (US)

(73) Assignee: INNOVAS TECHNOLOGIES LLC, Coralville, IA (US)

( * ) Notice: Subject to any disclaimer, the term of this patent is extended or adjusted under 35 U.S.C. 154(b) by 436 days.

(21) Appl. No.: 18/080,088

(22) Filed: Dec. 13, 2022

(65) Prior Publication Data

US 2024/0192177 A1    Jun. 13, 2024

(51) Int. Cl.
| | |
|---|---|
| *G01N 29/24* | (2006.01) |
| *F28F 27/00* | (2006.01) |
| *G01K 1/022* | (2021.01) |
| *G01N 27/90* | (2021.01) |

(52) U.S. Cl.
CPC ............. *G01N 29/24* (2013.01); *F28F 27/00* (2013.01); *G01K 1/022* (2013.01); *G01N 27/9006* (2013.01); *F28F 2265/00* (2013.01)

(58) Field of Classification Search
None
See application file for complete search history.

(56) References Cited

U.S. PATENT DOCUMENTS

| | | | |
|---|---|---|---|
| 5,062,300 A | 11/1991 | Valee | |
| 5,090,259 A | 2/1992 | Shishido | |
| 5,313,838 A | 5/1994 | Gondard | |
| 5,471,879 A | 12/1995 | Vinot | |
| 8,601,875 B2 | 12/2013 | Paulson | |
| 8,863,820 B2 | 10/2014 | Laursen et al. | |
| 9,791,222 B2 | 10/2017 | Jiang | |
| 9,903,673 B1* | 2/2018 | Dirks | .......... A61L 2/10 |
| 2011/0162454 A1* | 7/2011 | Paulson | ........... G01N 29/07 |
| | | | 73/592 |
| 2011/0282619 A1* | 11/2011 | Laursen | ............. G01K 13/02 |
| | | | 702/182 |
| 2018/0238646 A1* | 8/2018 | Baxter | ............. B08B 9/0321 |
| 2020/0064797 A1* | 2/2020 | Hannon | ........... H04L 63/104 |

* cited by examiner

*Primary Examiner* — Clayton E. LaBalle
*Assistant Examiner* — Diana Hancock
(74) *Attorney, Agent, or Firm* — SHUTTLEWORTH & INGERSOLL, PLC; Jason R. Sytsma

(57) ABSTRACT

A system and method for monitoring heat exchanger tube health without requiring the heat exchanger system to be shut down and disassembled and without operator intervention. At least one wireless sensor ball (WSB) assembly is positioned in the heat exchanger system. The heat exchanger system includes an ultrasonic acoustic receiver array mounted therewithin. WSB assembly information is gathered regarding status, operating condition, health, efficiency of the piping system, and/or, piping system health trends.

20 Claims, 3 Drawing Sheets

SYSTEM AND METHOD FOR MONITORING AND DIAGNOSIS OF HEAT EXCHANGER TUBE HEALTH

BACKGROUND OF THE INVENTION

1. Field of the Invention

The present invention relates generally to the monitoring and diagnosing of the health of heat exchanger systems and more particularly to the use of a wireless sensor ball (WSB) assembly that cooperates with an ultrasonic acoustic receiver for enabling such monitoring, diagnosing, and location detection.

2. Description of the Related Art

The most commonly practiced method for assessing the state of a heat exchanger, and in particular the individual tubes that come in contact with the working fluid, is to open the unit and examine each individual tube manually. This is a highly labor-intensive process and leads to substantial down time and associated costs as the unit is taken apart and examined.

Specific measurements used during tube inspection include eddy current sensors and ultrasonic probes, as well as simple video inspection with a fiberscope or video camera. These instruments, which are inserted manually into the tubes one at a time, give an indication of wall thinning and cracking.

U.S. Pat. No. 8,863,820, issued to Laursen et al. entitled, "MEASUREMENT DEVICE FOR HEAT EXCHANGER AND PROCESS FOR MEASURING PERFORMANCE OF A HEAT EXCHANGER," discloses a temperature measurement device in combination with a furnace heat exchanger. An instrumented heat tracer sensor is launched into the heat exchanger which records the temperature of the fluid and performance at data points along the length of the heat exchanger. If a spike in the temperature as measured and recorded, since the speed of the heat tracer sensor is known, the location of the temperature increase is known which infers a burn through in the furnace. A three-way valve includes a retrieve port, a chamber port, and a launch port. A small sensor control pump and a large heat exchanger flow pump propel the heat tracer sensor through the system. A plastic chamber retains the heat tracer sensor for interrogation and downloading information when the sensor is not in use in the heat exchanger. A control station communicates with the heat tracer sensor and extracts the stored temperature data therefrom. The Laursen patent does not describe assessing comprehensive heat exchanger health, assessing flow rates inside of exchanger tubes, or determining in which tube temperature measurements are taken.

Present inventors are co-inventors of U.S. Pat. No. 9,903,673, entitled "INTELLIGENT BALL FOR MONITORING AND DIAGNOSIS OF HEAT EXCHANGER TUBE HEALTH." The '673 patent discloses an intelligent ball sensor assembly for use with a heat exchanger system that includes a mechanically compliant ball having a recess formed therein. At least one sensor positioned on the ball is configured to gather selected information regarding a heat exchanger system. Signal conditioning control/transmission circuitry is operatively connected to the sensor. A power source is operatively connected to the at least one sensor and the signal conditioning control/transmission circuitry. The sensor and the signal conditioning control/transmission circuitry cooperate to gather information about the status, health and efficiency of the heat exchanger system. Although the device disclosed in the '673 patent is very useful it is somewhat deficient in providing location information of the intelligent ball sensor assembly within the heat exchanger system. The determination of the intelligent ball location related to a specific tube or region of tubes within the heat exchanger is important in that it enables the information collected from the intelligent ball sensor assembly to relate specifically to an individual tube or regions of tubes within the heat exchanger. Optimization of such a determination translates to the ability to use/relate the data collected by the wireless sensor ball for fault detection, performance trends, wearing trends etc. related to the location the sensor collected the data.

SUMMARY OF THE INVENTION

In one aspect, the present invention is embodied as a heat exchanger system including:
  a) a heat exchanger assembly;
  b) an ultrasonic acoustic receiver array mounted within the heat exchanger assembly;
  c) at least one wireless sensor ball (WSB) assembly;
  d) an acoustic signal processing unit (ASPU);
  e) a WSB charging system; and,
  f) a system computer processing unit (CPU).

The heat exchanger assembly includes a heat exchanger section including a number of heat exchanger tubes; an exchanger inlet plenum in fluid communication with the heat exchanger section, which is configured to receive inlet fluid; and, an exchanger outlet plenum in communication with the heat exchanger section.

The ultrasonic acoustic receiver array mounted within the heat exchanger assembly includes at least two hydrophones configured to receive ultrasonic acoustic pulses and determine the location of the origin of the ultrasound acoustic pulses.

Each WSB assembly includes a housing with the at least one sensor proximate a surface of the housing or within the housing and configured to gather selected information regarding the heat exchanger assembly and its current operating conditions. The signal conditioning control/transmission circuitry is positioned within the housing and operatively connected to the sensor. A power source is positioned within the housing and operatively connected to the at least one sensor and the signal conditioning control/transmission circuitry, wherein the sensor and the signal conditioning control/transmission circuitry cooperate to gather WSB assembly information about a status, operating condition, health, efficiency of the heat exchanger system, and/or, heat exchanger system health trends. An ultrasound omnidirectional acoustic transmitter is operatively connected to the power source and the signal conditioning control/transmission circuitry. A data storage element is located in the housing for storage and buffering of the WSB assembly information collected by the sensor.

The acoustic signal processing unit (ASPU) is operatively connected to the ultrasonic acoustic receiver array and configured to process an ultrasonic acoustic receiver array output signal. The WSB charging system is positioned within a fluid conduit located between the exchanger outlet plenum and the exchanger inlet plenum. A system computer processing unit (CPU) is 1) operatively connected to the ASPU; and 2) in wireless data communication to a WSB assembly currently located within the WSB charging system.

In a preferred embodiment, the ultrasonic acoustic receiver array is located on a back wall of the heat exchanger assembly, wherein the system CPU computes the direction of arrival (DOA) of WSB assemblies along two dimensions to locate which heat exchanger tube of the plurality of heat exchanger tubes the WSB assembly has entered.

In another broad aspect, the present invention is embodied as a method for collecting and synthesizing information regarding a heat exchanger system. This method includes the steps of:
  a) providing a heat exchanger system of a type including a heat exchanger assembly, comprising:
    i) a heat exchanger section including a plurality of heat exchanger tubes;
    ii) an exchanger inlet plenum in fluid communication with the heat exchanger section, the exchanger inlet plenum configured to receive inlet fluid; and
    iii) an exchanger outlet plenum in fluid communication with the heat exchanger section;
  b) receiving ultrasound acoustic pulses from at least two hydrophones associated with an ultrasonic acoustic receiver array mounted within the heat exchanger assembly, and determining the location of the origin of the ultrasound acoustic pulses;
  c) gathering WSB assembly information about a status, operating condition, health, efficiency of the heat exchanger system, and/or heat exchanger system health trends utilizing a WSB assay of the type, having:
    i) a housing;
    ii) at least one sensor on a surface of the housing or within the housing configured to gather selected information regarding the heat exchanger assembly and its current operating conditions;
    iii) a power source positioned within the housing and operatively connected to the at least one sensor and the signal conditioning control/transmission circuitry;
    iv) an ultrasound omnidirectional acoustic transmitter operatively connected to the power source and the signal conditioning control/transmission circuitry;
    v) a data storage element located in the housing for storage and buffering of the WSB assembly information collected by the at least one sensor;
  d) processing an ultrasonic acoustic receiver array output signal utilizing an acoustic signal processing unit (ASPU) operatively connected to the ultrasonic acoustic receiver array.

In another broad aspect, the present invention is embodied as a wireless processing an ultrasonic acoustic receiver array output signal utilizing an acoustic signal processing unit (ASPU) operatively connected to the ultrasonic acoustic receiver array:
  a) a housing;
  b) at least one sensor on a surface of the housing or within the housing configured to gather selected information regarding the fluid conduit assembly and its current operating conditions;
  c) signal conditioning control/transmission circuitry positioned within the housing and operatively connected to the at least one sensor;
  d) a power source positioned within the housing and operatively connected to the at least one sensor and the signal conditioning control/transmission circuitry, wherein the at least one sensor and the signal conditioning control/transmission circuitry cooperate to gather WSB assembly information about a status, operating condition, health, efficiency of the piping system, and/or, piping system health trends;
  e) an ultrasound omnidirectional acoustic transmitter operatively connected to the power source and the signal conditioning control/transmission circuitry; and,
  f) a data storage element located in the housing for storage and buffering of the WSB assembly information collected by the at least one sensor, wherein the WSB assembly is configured to operate with the ultrasonic acoustic receiver array.

Thus, the present invention provides a system and method for monitoring heat exchanger tube health without requiring the heat exchanger system to be shut down and disassembled and without operator intervention. The method is affordable and robust and can provide a continuous stream of data that allows continuous frequent inspections. This "intelligent ball" technology of the present invention can also be used to optimize heat exchanger parameters such as flow (e.g. by determining the ideal state of pumps and valves) which, in turn, enables intelligent decisions to improve heat exchanger process operations and energy efficiency. This technology can allow the scheduling of routine maintenance such as tube cleaning, or can be used in conjunction with cleaning by objects inserted or released into the heat exchanger during normal operation (e.g. compliant balls). The cleaning balls used in current systems are "dumb" and serve to keep the condenser tubes clean. Consequently, the "intelligent balls" of the present invention and the regular (dumb) sponge rubber balls can be operated together to provide both preventative cleaning and active data capture from the heat exchanger.

Unlike systems presented in the prior art, in some embodiments, the present system can assess comprehensive heat exchanger health including such parameters as wall pitting, cracking and thinning, scaling, with a high degree of locational accuracy within the heat exchanger, and mechanical problems with ancillary systems such as pumps, biofouling or leakage of coolant. In some embodiments, it can assess flow rates inside the exchanger tubes. Furthermore, in some embodiments, it can precisely determine the tube in which a sensor measurement is taken.

The present invention can provide the capability to determine vibration levels and frequencies generated by the heat exchanger assembly, parts operating within it and occurring water flow. Specifically, the detection and measurement of vibration levels enables the present invention to detect abnormal vibrations possibly originating from pumps, valves, tube failures or any rotating part serving as part of the heat exchanger system.

Other objects, advantages, and novel features will become apparent from the following detailed description of the invention when considered in conjunction with the accompanying drawings.

DETAILED DESCRIPTION OF THE INVENTION

Figure 1:
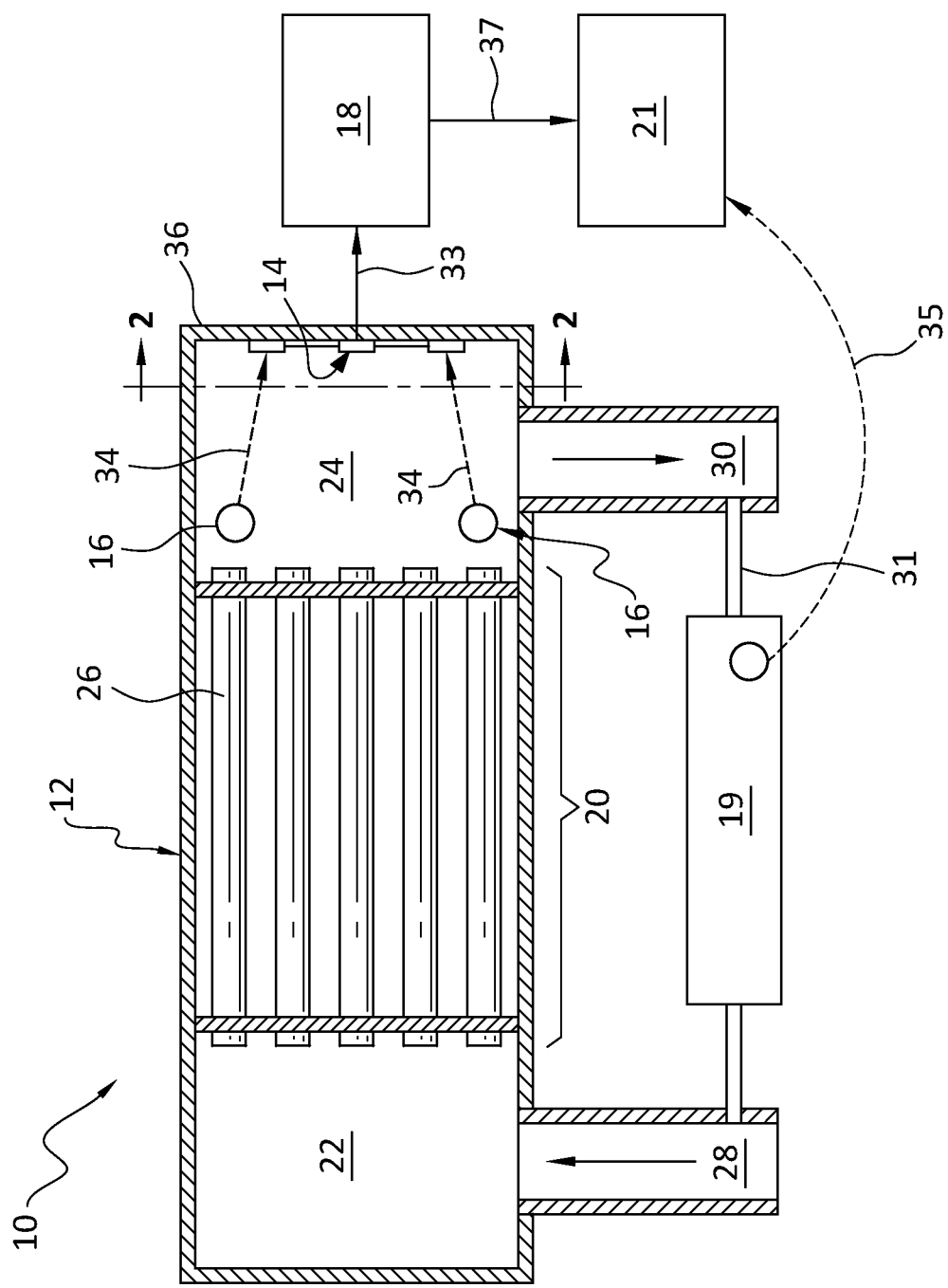
FIG. 1 is a schematic illustration of the heat exchanger system of the present invention.

Referring now to the drawings and the characters of reference marked thereon, Figure illustrates a preferred embodiment of the heat exchanger system of the present invention, designated generally as 10.

The heat exchanger system 10 includes a heat exchanger assembly 12, an ultrasonic acoustic receiver array 14 mounted within the heat exchanger assembly 12, at least one wireless sensor ball (WSB) assembly 16; an acoustic signal processing unit (ASPU) 18, a WSB charging station 19, and, a system computer processing unit (CPU) 21.

The heat exchanger assembly 12 includes a heat exchanger section 20, an exchanger inlet plenum 22, and an exchanger outlet plenum 24. The heat exchanger section 20 includes a plurality of heat exchanger tubes 26. The exchanger inlet plenum 22 is in fluid communication with the heat exchanger section 20. The exchanger inlet plenum is configured to receive inlet flow 28. The exchanger outlet plenum 24 is it in fluid communication with the heat exchanger section 20. It provides an outlet flow 30.

The heat exchanger assembly 12 may take the form of any number of different types of devices or systems such as heat exchangers using shell and tubes used for heat exchange in a diverse set of liquids including but not limited to water, hydrocarbon liquids, chemicals, distillates etc.

The heat exchanger assembly is designed to extract heat from a liquid or gas and as such, can be configured with various designs including unique types of tubes, internal flow enhancements of tubes, use of varied tube geometry including curved, straight, horizontal, vertical or a combination thereof. The heat exchanger assembly 12 depicted in FIG. 1 is of a single-pass type for the purposes of clarity, however, the principles of the present invention can be applied to heat exchangers of multiple tube-side passes.

The ultrasonic acoustic receiver array 14 is mounted within the heat exchanger assembly 12. Referring to FIG. 2, it includes at least two hydrophones 32, five hydrophones 32 shown in the drawing. The array 14 is configured to receive the ultrasonic acoustic pulses, designated by arrows 34 in FIG. 1. In another preferred embodiment, there are four hydrophones.

Figure 2:
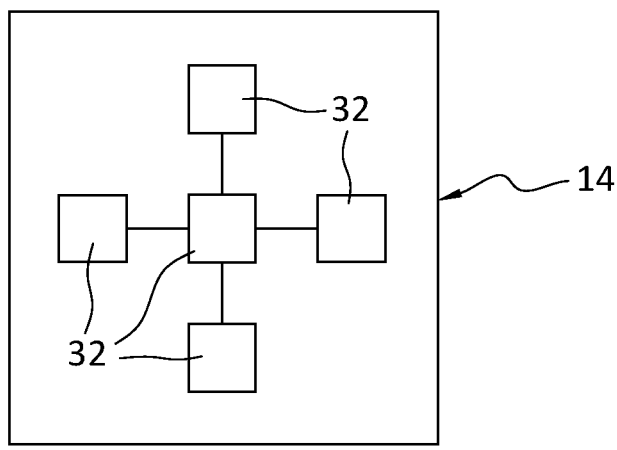
FIG. 2 is a view taken along line 2-2 of FIG. 1.

In the embodiment illustrated in FIG. 1, the ultrasonic acoustic receiver array 14 is located on the back wall 36 of the heat exchanger assembly 12. The ultrasonic acoustic receiver array 14 identifies the direction of arrival (DOA) along two dimensions to locate which heat exchanger tube 26 that the WSB assembly 16 has entered.

The WSB charging system (or station) 19 is positioned within a fluid conduit 31 located between the exchanger outlet plenum 28 and the exchanger inlet plenum 22.

The hydrophone array 14 is configured and placed in the heat exchanger outlet plenum 24 in a manner that best enables receipt of ultrasound pulses emanating from any location within the heat exchanger tube bundle. The hydrophone design can vary based on the internal environment of the operating heat exchanger and its individual design.

Figure 3:
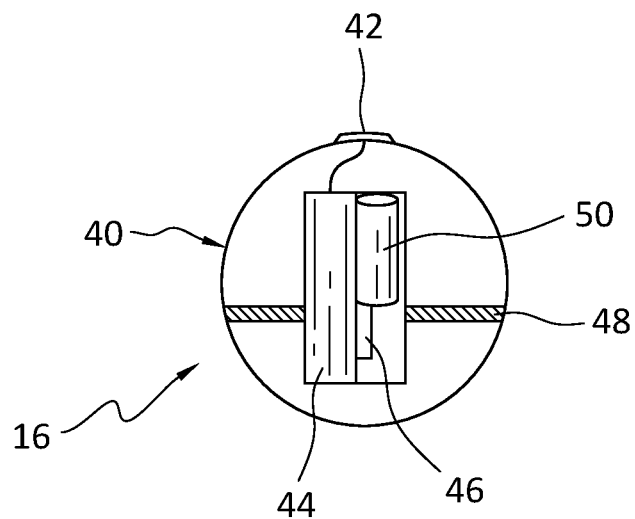
FIG. 3 is a schematic illustration of a wireless sensor ball (WSB) assembly in accordance with the principles of the present invention.

Referring now to FIG. 3, each WSB assembly 16 includes a housing 40 and at least one least one sensor 42 on a surface of the housing 40 or within the housing 40 configured to gather selected information regarding the heat exchanger assembly and its current operating conditions.

Signal conditioning control/transmission circuitry 44 is positioned within the housing and operatively connected to the sensor 42. Signal conditioning/transmission circuitry 44 serves to combine, configure, and fuse data from single or multiple sensors 42 to be used further as diagnostic and software defined measurement.

A power source 46 is positioned within the housing and operatively connected to the sensor 42 and the signal conditioning control/transmission circuitry 44, wherein the sensor 42 and the signal conditioning control/transmission circuitry 44 cooperate to gather WSB assembly information about the status, operating condition, health, efficiency of the heat exchanger system, and/or, heat exchanger system health trends. Power source 46 is capable of smartly distinguishing times when power activation is not needed and can shed power to select individual subsystems of the WSB assembly 16.

An ultrasound omnidirectional acoustic transmitter 48 is operatively connected to the power source 46 and the signal conditioning control/transmission circuitry 44. A data storage element 50 is located in the housing 40 for storage and buffering of the WSB assembly information collected by the sensor(s) 42.

The acoustic signal processing unit (ASPU) 18 is operatively connected to the ultrasonic acoustic receiver array 14 and configured to process an ultrasonic acoustic receiver array output signal 33.

The system CPU 21 is operatively connected to the ASPU to receive an ASPU output signal 37. The system CPU 21 is configured to also receive a WSB wireless output signal 35 from a WSB assembly 16 that is positioned within the WSB charging system 19.

Figure 4:
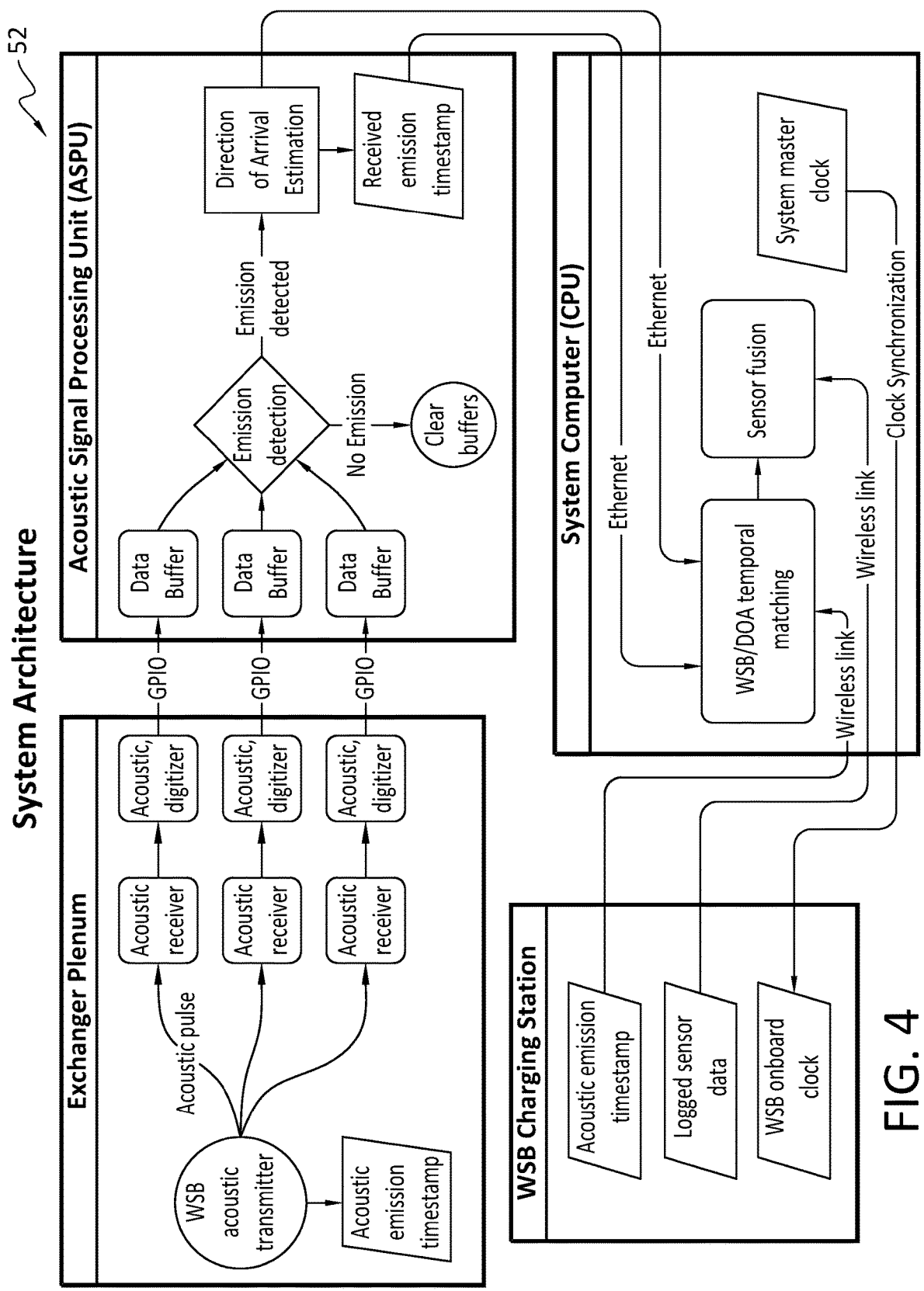
FIG. 4 is a schematic illustration of the heat exchanger system architecture of the present invention.

Referring now to FIG. 4 the system architecture the heat exchanger system of the present invention is illustrated, designated generally as 52. This figure presents the flow of information through the heat exchanger system 10. The numeral designations in this description are keyed to those identified with reference to FIGS. 1-3, in the above discussion. Information from the ultrasound omnidirectional acoustic transmitter 48 within the WSB assembly 16 is timestamped. The acoustic pulse from the WSB acoustic transmitter is received by the acoustic receivers in the ultrasonic acoustic receiver array 14. Data received by the acoustic receiver array 14 is amplified, digitized, and communicated to the acoustic signal processing unit 18. The acoustic signal processing unit 18 buffers data and can identify and discard buffered data that does not include an emission detection. When the acoustic signal processing unit 18 detects an acoustic emission from a WSB assembly 16 a direction of arrival estimation is calculated and the received emission timestamp is recorded. Information is communicated from the acoustic signal processing unit 18 to the system computer 21.

When a WSB assembly 16 arrives in the WSB charging station 19, its acoustic emission timestamp and logged sensor data are communicated via the wireless link to the system computer 21. The system computer (i.e. CPU) 21 communicates the system master clock information to the clock onboard the WSB assembly 16 for system clock synchronization.

The system computer 21 performs the algorithms to compare sensor information and match timestamps from WSB acoustic emissions with timestamps for acoustic signal processing unit's direction of arrival received emissions. These system computer algorithms enable the system computer 21 to determine what sensor information is associated with the specific locations of the heat exchanger assembly 12 in which the sensor information was detected.

Each wireless sensor ball (WSB) assembly 16 is an intelligent sensor assembly that includes the housing 40 having a recess formed therein.

In some embodiments, the interior of the intelligent ball may comprise a walled rigid central portion of somewhat smaller diameter than the inner diameter of the heat exchanger tube. The walled region (or portion) contains the recess with electronic components and packaging inside of it. This rigid core may in some embodiments be surrounded by a compliant outer structure to allow a degree of flexibility during the ball's transit in the tube and facilitate easy passage. The compliant outer structure can also be comprised of a hardness level and or as a material composition that facilitates ultrasound frequency pulses from the WSB. As used herein the term "compliant" refers to a degree of hardness suitable for a particular application. The term "ball" refers to an object that is generally round but may be somewhat oblong, etc. While a spherical or rounded oblong shape is generally preferred, in some embodiments it may be preferable to use a more highly tapered shape, or a shape incorporating ridges, bosses, fins or raised areas to facilitate preferential alignment of the ball inside the tube in one particular orientation or another. A preferred orientation may arise from the desire to sample parameters such as temperature in one or more regions proximal or distal to the pipe wall.

The sensor 42 may be one or a combination of various sensors. These may include, for example, piezoelectric sensors, temperature sensors, inertial sensors, pressure sensors, chemical sensors, eddy current sensors, magnetic flux leakage sensors, and ultrasonic transducers. The piezoelectric sensors may measure reflected ultrasound and can provide information regarding, for example, cracks, scaling, pinholes, and wall thinning. Or, they may measure acoustic emission and provide information regarding cracks; mechanical failures such as bad pump bearings. The temperature sensors may provide information, for example, regarding bio-fouling or water velocity. The inertial sensors may include, for example, angle rate sensor and accelerometers for providing information on, for example, location within heat exchanger and water velocity. The chemical sensors may measure chemical composition and provide information, for example, pH, presence of working fluid or lubricant, or oxidation reduction potential, and/or bio-fouling.

Some of the sensors may be located within the recess of the mechanically compliant ball. Some sensors may be located on or near the surface of the housing 40, in cases where those sensors need intimate contact with the tube wall or ambient environment or to transmit pulses out through the housing.

The signal conditioning control/transmission circuitry 44 takes the signal from these sensors and converts it to a digital value for transmission off the WSB assembly 16. In some cases the sensor output may already be digital. The circuitry 44 may also buffer (store) or otherwise condition or convert the signal. The data is then sent to a transceiver for transmission from the intelligent ball to a central data location, i.e. base station. In some embodiments, this transmission is accomplished by means of a radio (Bluetooth, ZigBee, or some other proprietary or accepted transmission protocol) and in some embodiments it is transmitted by an ultrasonic, near-field or galvanic data link, or other appropriate means. This data is then received at a central location or at a number of reader nodes.

An intelligent ball sensor assembly 16, through the use of dead reckoning using data from on-board inertial sensors, may sense and calculate position information which can then be used to correlate tube health to individual tubes in the heat exchanger. Furthermore, WSB assemblies 16 can communicate with each other and provide ball location determinations using stochastic characterization. Alternately, a method for determining ball location using beacons placed or integrated with the exchanger and received at the intelligent ball could be used. These beacons could be radiofrequency (RF) or ultrasonic beacons, or some other modality from which triangulation could be performed. Thus, as shown in FIG. 3, the signal conditioning control/transmission circuitry 44 is shown with an acoustic transmitter 48 for providing transmission to the ultrasonic acoustic receiver array 14. The acoustic receiver array 14 can also serve as a position clarifier and supplement to improve location determination when derived from methods other than just the acoustic receiver array.

In one embodiment, sensors located on the WSB assembly 16 form a ring around the circumference of the WSB assembly 16, guaranteeing that there would be a sensor in contact with the tube wall, no matter what the orientation was when the ball entered the tube. In another embodiment a panoramic lens is used to provide a complete field of view of the pipe interior regardless of ball orientation. In another approach the ball is intentionally shape or weighted such that it preferentially orients itself when entering a tube of the heat exchanger. In some cases it may be favorable to design the ball to be somewhat larger than the tube entrance, guaranteeing that the ball is compressed somewhat, bringing sensors into intimate contact with tube walls.

In one embodiment of a normal operation, each WSB assembly 16 makes a complete circuit of the heat exchanger loop, after which it is captured in the WSB charging station 19. In the WSB charging station 19, sensor data stored by the WSB assembly 16 can be transferred to the CPU 21 for analysis and viewing by the user by means of appropriate software. In some embodiments, the data recorded during transit of the heat exchanger may be transferred from the sensor assemblies to a receiving antenna by means of an RF (radio frequency) link, or by means of an acoustic data communications channel or optical link. The transfer of power from the outside of the WSB charging station 19 to the WSB assemblies 16 may be accomplished by an inductive power link operating in either a resonant or non-resonant mode. In some embodiments WSB charging station 19 is configured such that when trapped, the WSB assemblies 16 are forced into a linear configuration (one after the other) to allow efficient power coupling from one or more charging coils. Each intelligent ball sensor assembly preferably has a rechargeable power source, which may in some embodiments may be a battery or supercapacitor. In some embodiments, intelligent ball sensor assemblies may have a means for scavenging power from the environment through thermoelectric or mechano-electrical conversion. After the data download, the intelligent ball sensor assembly is re-initialized and sent back into circulation for another loop. A large number of intelligent ball sensor assemblies completing multiple independent loops ensures that data is obtained from every heat exchanger tube over a predicted number of transit cycles. As described above, the use of positioning information allows the construction of a map of the health of the entire heat exchanger system.

In some embodiments the WSB assembly is configured so that when the WSB assembly enters or exits a heat exchanger tube it causes an acoustic transmitter on the WSB assembly to emit an acoustic emission pulse at the time of tube entry or exit and log the time of pulse emission in an WSB assembly on-board clock.

In some embodiments the heat exchanger is configured to make the acoustic emission pulse occur when the WSB assembly is on the same end of the heat exchanger tube as the acoustic receiver array.

In some embodiments the WSB assembly is hermetically sealed.

In some embodiments the sensor comprises a temperature sensor for measuring a local temperature gradient in a heat exchanger tube.

In some embodiments multiple acoustic receiver arrays are located within the heat exchanger system, enabling location determination of the WSB assemblies as they traverse each section of heat exchanger tubes.

In some embodiments the sensor is an ultrasonic transducer which allows the injection of ultrasonic energy into a wall of a heat exchanger tube, and measurement of reflected power back at the transducer, with a sensor response allowing interpretation of the state and condition of the heat exchanger tube.

In some embodiments the sensor is a MEMS inertial sensor for providing deduced reckoning of ball location for determining a precise heat exchanger tube of the heat exchanger system in which the ball enters or exits, thus allowing the characterization of the tube health at the level of individual tubes, wherein the MEMS inertial sensor can be fused with ultrasound beaconing for increased accuracy in WSB tube location determination.

In some embodiments the WSB assembly location is calculated by a microprocessor and supplemented by information determined by the ultrasonic receiver acoustic array, in real time.

In some embodiments the WSB assembly includes means for providing neutral buoyancy of the WSB assembly within the fluid conduit assembly.

In some embodiments the heat exchanger assembly may include means for providing vibration detection. This means may be part of the WSB assembly or the ultrasonic acoustic receiver array.

The subject inventive concepts have applications to other systems in which tube or pipe health is important. For example, this technology can be used for industrial process monitoring, residential or commercial plumbing, or could be applied to drilling and exploration processes in which a fluid is pumped into a network of fissures and later extracted.

In some embodiments, the intelligent ball sensor assembly can emit or release a signal or tracer that is picked up on the outside of the tube or exchanger for diagnostic purposes (e.g emit IR or x ray radiation or other modality used to image the pipe or screen for holes by detecting the emitted radiation outside the exchanger, or in the case of the tracer, can be detected in the shell side fluid (i.e. outside the tubes) if there is a leak in the tubes.)

In some embodiments the intelligent ball sensor assemblies can communicate to each other in a network topology, via RF or acoustic signaling, to improve location information or enable better communication reliability. For example, an encoded ultrasound signal may be transmitted from each intelligent ball sensor assembly and received by nearby intelligent ball sensor assemblies, allowing a determination of distance based on received signal strength. By integrating information about the relative distances and directions between a plurality of intelligent ball sensor assemblies in a network configuration, and between the ball trap and certain intelligent ball sensor assemblies beginning and ending their transit, it may be possible to determine the relative positions of all intelligent ball sensor assemblies in the heat exchanger system. To further enhance the system, the acoustic sensor array can provide an additional method of location determination that can aid location identification and improve accuracy when in ball to ball location determination is conducted.

Different transmission means may have certain advantages. For example, ultrasonic communication from ball to receiver or ball-to-ball may provide enhanced power efficiency of data transmission. Data transmission may be in short bursts coincident with intelligent ball sensor assembly recharging.

Cloud enabled software can provide the enabler to track and maintain system maintenance records down to the individual tube level including tube anomaly and tube identification and location.

Although the intelligent ball sensor assemblies have been described relative to their use in a heat exchanger system they may be used in other types of piping systems, such as normal piping systems within a large building, to determine, for example, fluid leaks and location determination of anomalies.

Other embodiments and configurations may be devised without departing from the spirit of the invention and the scope of the appended claims.

The invention claimed is:

1. A heat exchanger system, comprising:
   a) a heat exchanger assembly, comprising:
      i) a heat exchanger section including a plurality of heat exchanger tubes;
      ii) an exchanger inlet plenum in fluid communication with said heat exchanger section, said exchanger inlet plenum configured to receive inlet fluid; and
      iii) an exchanger outlet plenum in fluid communication with said heat exchanger section;
   b) an ultrasonic acoustic receiver array mounted within the heat exchanger assembly, comprising at least two hydrophones configured to receive ultrasound acoustic pulses and determine the location of the origin of said ultrasound acoustic pulses; and,
   c) at least one wireless sensor ball (WSB) assembly, each WSB assembly comprising:
      i) a housing;
      ii) at least one sensor on a surface of said housing or within the housing configured to gather selected information regarding the heat exchanger assembly and its current operating conditions;
      iii) signal conditioning control/transmission circuitry positioned within the housing and operatively connected to said at least one sensor;
      iv) a power source positioned within the housing and operatively connected to said at least one sensor and said signal conditioning control/transmission circuitry, wherein said at least one sensor and said signal conditioning control/transmission circuitry cooperate to gather WSB assembly information about a status, operating condition, health, efficiency of the heat exchanger system, and/or, heat exchanger system health trends;
      v) an ultrasound omnidirectional acoustic transmitter operatively connected to the power source and said signal conditioning control/transmission circuitry; and,
      vi) a data storage element located in said housing for storage and buffering of said WSB assembly information collected by said at least one sensor;
   d) an acoustic signal processing unit (ASPU) operatively connected to said ultrasonic acoustic receiver array and configured to process an ultrasonic acoustic receiver array output signal;
   e) a WSB charging system positioned within a fluid conduit located between said exchanger outlet plenum and said exchanger inlet plenum; and,
   f) a system computer processing unit (CPU) 1) operatively connected to said ASPU; and 2) in wireless data communication to a WSB assembly positioned within said WSB charging system.

2. The heat exchanger system of claim 1, wherein said ultrasonic acoustic receiver array is located on a back wall of the exchanger outlet plenum of said heat exchanger assembly, wherein said system CPU computes the direction of arrival (DOA) of WSB assemblies along two dimensions to locate which heat exchanger tube of said plurality of heat exchanger tubes the WSB assembly has entered.

3. The heat exchanger system of claim 1, wherein said ultrasonic acoustic receiver array comprises five hydrophones.

4. The heat exchanger system of claim 1, wherein said ultrasonic acoustic receiver array comprises four hydrophones.

5. The heat exchanger system of claim 1, wherein said WSB assembly is configured so that when said WSB assembly enters or exits a heat exchanger tube it causes an acoustic transmitter on the WSB assembly to emit an acoustic emission pulse at the time of tube entry or exit, and log the time of pulse emission in an WSB assembly on-board clock.

6. The heat exchanger system of claim 5, configured to make the acoustic emission pulse occur when the WSB assembly is on the same end of the heat exchanger tube as said acoustic receiver array.

7. The heat exchanger system of claim 1, wherein said WSB assembly is hermetically sealed.

8. The heat exchanger system of claim 1, wherein said at least one sensor comprises a temperature sensor for measuring a local temperature gradient in a heat exchanger tube of said plurality of heat exchanger tubes.

9. The heat exchanger system of claim 1, wherein said at least one sensor comprises an inertial sensor.

10. The heat exchanger system of claim 1, wherein said at least one sensor comprises a chemical sensor.

11. The heat exchanger system of claim 1, wherein multiple acoustic receiver arrays are located within the heat exchanger system, enabling location determination of said WSB assemblies as they traverse each section of heat exchanger tubes.

12. The heat exchanger assembly of claim 1, wherein said at least one sensor comprises an ultrasonic transducer which allows the injection of ultrasonic energy into a wall of a heat exchanger tube of said plurality of heat exchanger tubes, and measurement of reflected power back at the transducer, with a sensor response allowing interpretation of the state and condition of the heat exchanger tube.

13. The heat exchanger assembly of claim 1, wherein said at least one sensor comprises an ultrasonic transducer which allows the injection of high-frequency ultrasonic energy into fluid in a heat exchanger tube of the heat exchanger system, sufficient to create cavitation of the fluid in the heat exchanger tube and achieve ultrasonic cleaning and removal of deposits on the surface of the heat exchanger tube.

14. The heat exchanger assembly of claim 1, wherein said at least one sensor comprises a MEMS inertial sensor for providing deduced reckoning of ball location for determining a precise heat exchanger tube of the heat exchanger system in which the ball enters or exits, thus allowing the characterization of the tube health at the level of individual tubes, wherein said MEMS inertial sensor can be fused with ultrasound beaconing for increased accuracy in WSB tube location determination.

15. The heat exchanger system of claim 1, wherein said wireless sensor ball (WSB) assembly location is calculated by a microprocessor and supplemented by information determined by the ultrasonic receiver acoustic array, in real time.

16. A method for collecting and synthesizing information regarding a heat exchanger system, comprising the steps of:
  a) providing a heat exchanger system of a type including a heat exchanger assembly, comprising:
    i) a heat exchanger section including a plurality of heat exchanger tubes;
    ii) an exchanger inlet plenum in fluid communication with said heat exchanger section, said exchanger inlet plenum configured to receive inlet fluid; and
    iii) an exchanger outlet plenum in fluid communication with said heat exchanger section;
  b) receiving ultrasound acoustic pulses from at least two hydrophones associated with an ultrasonic acoustic receiver array mounted within the heat exchanger assembly, and determining the location of the origin of the ultrasound acoustic pulses;
  c) gathering WSB assembly information about a status, operating condition, health, efficiency of the heat exchanger system, and/or heat exchanger system health trends utilizing a WSB assembly of the type, comprising:
    i) a housing;
    ii) at least one sensor on a surface of said housing or within the housing configured to gather selected information regarding the heat exchanger assembly and its current operating conditions;
    iii) a power source positioned within the housing and operatively connected to said at least one sensor and said signal conditioning control/transmission circuitry;
    iv) an ultrasound omnidirectional acoustic transmitter operatively connected to the power source and said signal conditioning control/transmission circuitry; and,
    v) a data storage element located in said housing for storage and buffering of said WSB assembly information collected by said at least one sensor; and,
  d) processing an ultrasonic acoustic receiver array output signal utilizing an acoustic signal processing unit (ASPU) operatively connected to said ultrasonic acoustic receiver array.

17. A wireless sensor ball (WSB) assembly for use with a fluid conduit assembly in a piping system, said fluid conduit assembly being of a type including an ultrasonic acoustic receiver array mounted within the fluid conduit assembly, comprising at least two hydrophones configured to receive ultrasound acoustic pulses and determine the location of the origin of said ultrasound acoustic pulses, comprising:
  a) a housing;
  b) at least one sensor on a surface of said housing or within the housing configured to gather selected information regarding the fluid conduit assembly and its current operating conditions;
  c) signal conditioning control/transmission circuitry positioned within the housing and operatively connected to said at least one sensor;
  d) a power source positioned within the housing and operatively connected to said at least one sensor and said signal conditioning control/transmission circuitry, wherein said at least one sensor and said signal conditioning control/transmission circuitry cooperate to gather WSB assembly information about a status, operating condition, health, efficiency of the piping system, and/or, piping system health trends;
e) an ultrasound omnidirectional acoustic transmitter operatively connected to the power source and said signal conditioning control/transmission circuitry; and,
f) a data storage element located in said housing for storage and buffering of said WSB assembly information collected by said at least one sensor, wherein said WSB assembly is configured to operate with said ultrasonic acoustic receiver array.

18. The wireless sensor ball (WSB) assembly of claim 17 wherein said fluid conduit assembly comprises a heat exchanger assembly.

19. The wireless sensor ball (WSB) assembly of claim 17 further including means for providing neutral buoyancy of said WSB assembly within the fluid conduit assembly.

20. The wireless sensor ball (WSB) assembly of claim 17, further including means for providing vibration detection.

* * * * *